(12) United States Patent
Dondek

(10) Patent No.: US 12,252,167 B2
(45) Date of Patent: Mar. 18, 2025

(54) DOUBLE-DECKER INDUSTRIAL CART

(71) Applicant: Volvo Car Corporation, Gothenburg (SE)

(72) Inventor: Kevin Dondek, Charleston, SC (US)

(73) Assignee: Volvo Car Corporation, Gothenburg (SE)

( * ) Notice: Subject to any disclaimer, the term of this patent is extended or adjusted under 35 U.S.C. 154(b) by 303 days.

(21) Appl. No.: 17/835,031

(22) Filed: Jun. 8, 2022

(65) Prior Publication Data

US 2023/0399039 A1 Dec. 14, 2023

(51) Int. Cl.
| | | |
|---|---|---|
| *B62B 3/10* | (2006.01) | |
| *B62B 3/00* | (2006.01) | |
| *B62B 3/02* | (2006.01) | |
| *B62B 5/00* | (2006.01) | |
| *B62B 5/06* | (2006.01) | |

(52) U.S. Cl.
CPC ............... *B62B 3/002* (2013.01); *B62B 3/02* (2013.01); *B62B 3/10* (2013.01); *B62B 5/00* (2013.01); *B62B 5/06* (2013.01); *B62B 2202/12* (2013.01)

(58) Field of Classification Search
CPC .. B62B 3/002; B62B 3/02; B62B 3/10; B62B 5/00; B62B 5/06; B62B 2202/12
See application file for complete search history.

(56) References Cited

U.S. PATENT DOCUMENTS

| | | | | |
|---|---|---|---|---|
| 4,052,084 | A * | 10/1977 | Propst | B62B 5/06 280/43.12 |
| 7,210,697 | B2 * | 5/2007 | Simpson | B62B 5/06 16/446 |
| 7,374,197 | B2 * | 5/2008 | Leverett | B60D 1/143 280/411.1 |
| 8,333,160 | B2 * | 12/2012 | Lin | B25H 3/02 108/25 |
| 11,590,994 | B2 * | 2/2023 | DeBry | B62B 3/002 |

OTHER PUBLICATIONS

FlexQube, Tugger Carts, https://www.flexqube.com/tugger-carts, pp. 1-8.

* cited by examiner

*Primary Examiner* — Bryan A Evans
(74) *Attorney, Agent, or Firm* — Clements Bernard Walker; Christopher L. Bernard

(57) ABSTRACT

Carts, dollies, heavy-duty industrial carts, pull carts, push carts, platform carts, etc., which are typically designed to move along a substantially horizontal surface, are provided herein. An industrial cart, according to one implementation, includes a lower frame having sufficient dimensions so as to support a lower crate (or pallet) having a known size. The industrial cart also includes a plurality of wheel assemblies connected to an underside of the lower frame. Also, the industrial cart includes an upper frame having sufficient dimensions so as to support an upper crate (or pallet) having a known size. Furthermore, the industrial cart includes a plurality of vertical posts configured to support the upper frame at any of a plurality of fixed heights above the lower frame.

19 Claims, 6 Drawing Sheets

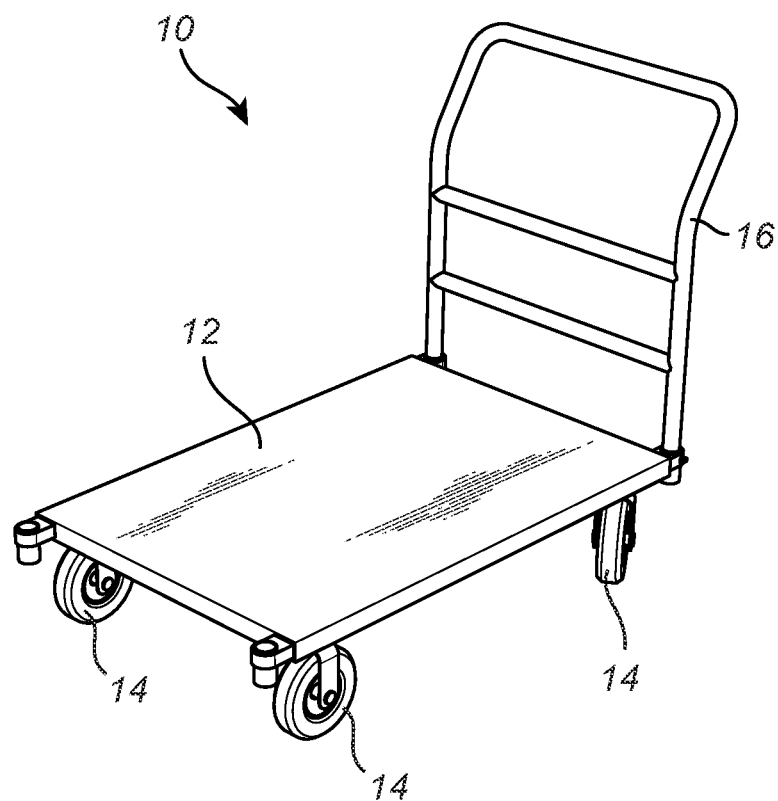
Prior art *FIG. 1A*
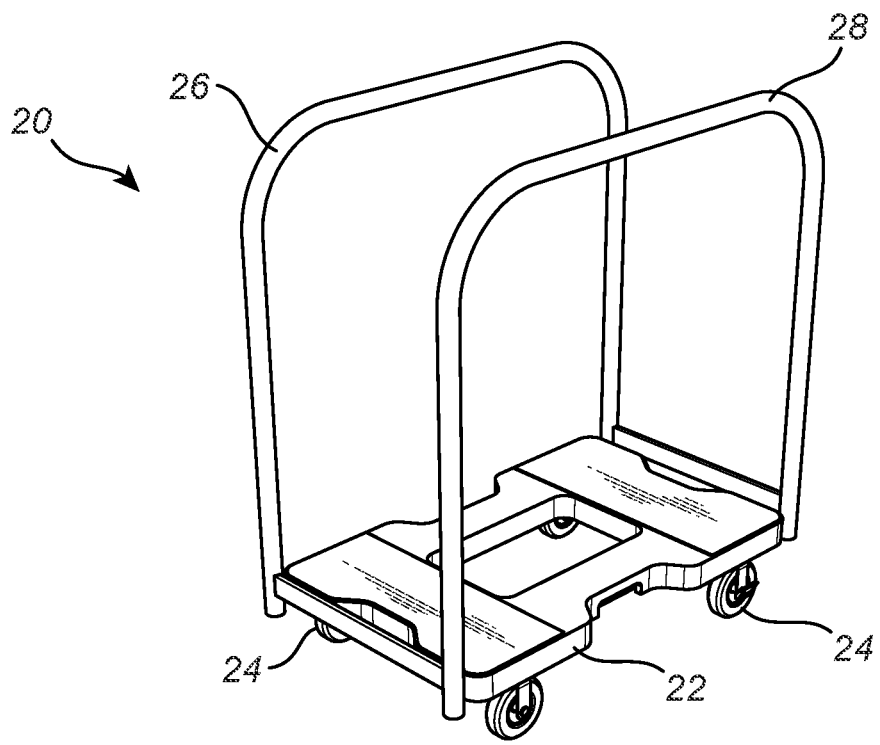
Prior art *FIG. 1B*

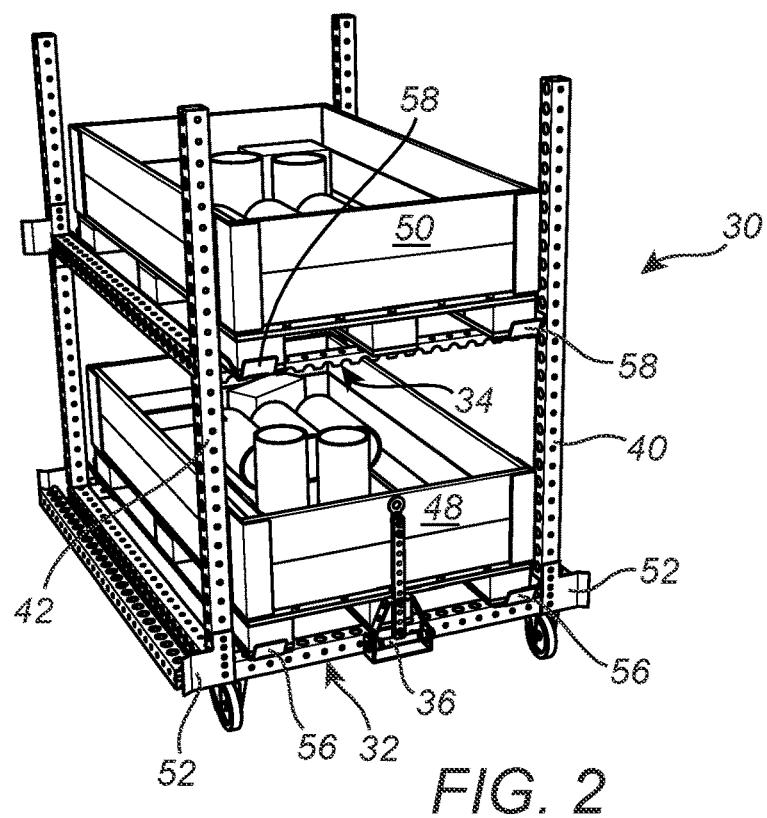
FIG. 2
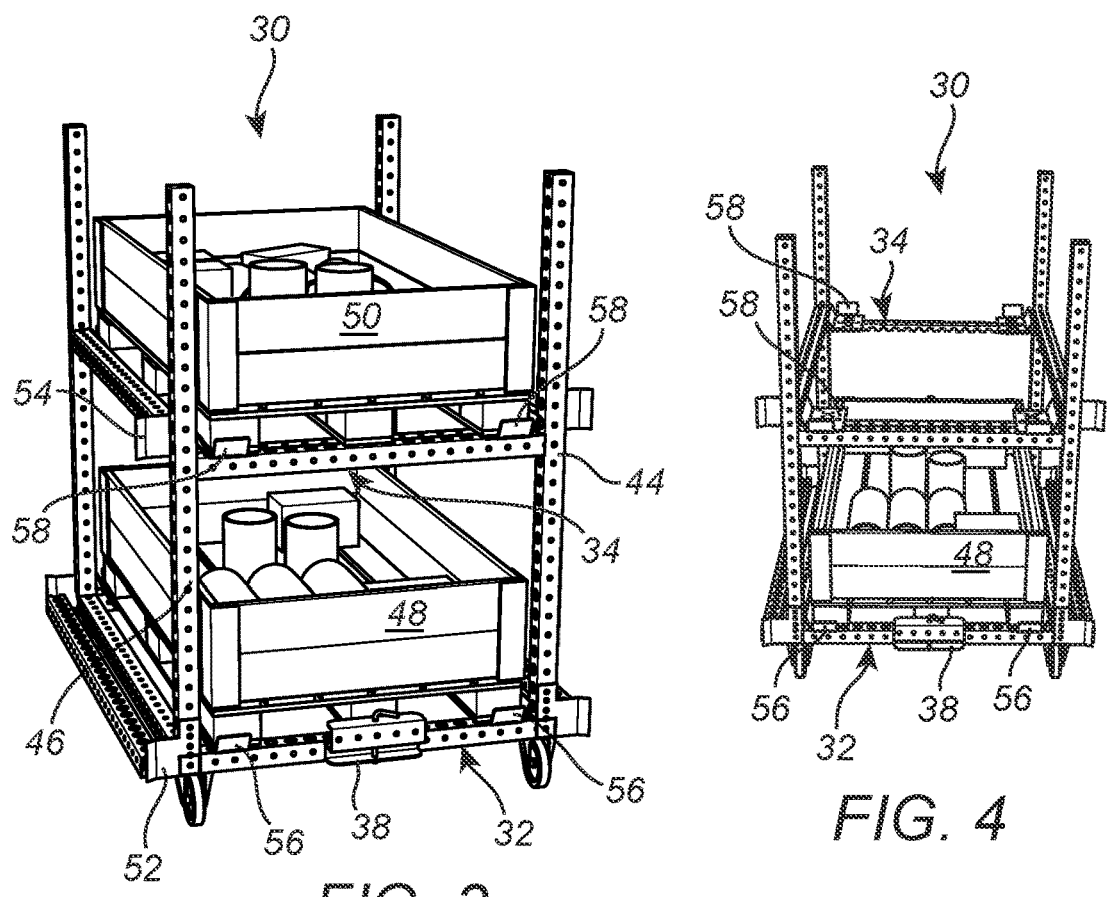
FIG. 3
FIG. 4

DOUBLE-DECKER INDUSTRIAL CART

TECHNICAL FIELD

The present disclosure generally relates to carts, dollies, hand trucks, and the like. More particularly, the present disclosure relates to a heavy-duty industrial cart having lower and upper frames configured for hauling multiple loaded crates or pallets at a time.

BACKGROUND

In a warehouse setting or other similar environment where the ground or floor is substantially level, there are many diverse types of equipment for moving objects from one place to another. For example, some of this equipment may include self-propelled vehicles, such as electric tractors, forklifts, electric tugger trains, industrial electric vehicles, electric burden carriers, warehouse utility vehicles, and the like, usually operated by a human driver.

Also, some equipment may be manually controlled by a person or in some cases can be pulled along behind an electric tugger train or the like. There are many types of manual devices for moving objects throughout an area (e.g., in a warehouse). For example, some manual devices may include hand trucks, pallet jacks, dollies, carts, heavy-duty industrial carts, pull carts, push carts, platform carts, platform trucks, etc. It may also be noted that different equipment may normally be used for different purposes. For example, a furniture dolly may be specifically designed to enable the movement of bulky items, such as furniture. Drywall dollies and drywall carts may be specifically designed to enable the movement of large or long pieces of construction materials, such as drywall panels, plywood panels, wall paneling, lumber, etc.

FIG. 1A is an image illustrating a conventional embodiment of a cart 10. In this case, the cart 10 includes a platform 12, which may be substantially horizontal or parallel to the ground on which the cart 10 is used. The cart 10 also includes wheels 14 and a handle 16. The wheels 14 may be casters and may be capable of swiveling. In many embodiments, the cart 10 may include four wheels 14, one under each corner of the platform 12. The handle 16 in this embodiment includes a metal bar bent in a form whereby one end is connected at a back left corner of the cart 10 and the other end is connected at a back right corner of the cart 10. The handle 16 includes a portion that is substantially parallel with the platform 12 and is used by a person to control the movement of the cart 10.

FIG. 1B is an image illustrating another conventional embodiment of a cart 20. In this case, the cart 20 includes a platform 22, wheels 24 (or casters), a first handle 26, and a second handle 28. As opposed to the handle 16 shown in FIG. 1A, the first and second handles 26, 28 are arranged with respect to the sides of the platform 22. In particular, the first handle 26 includes a first end that is connected at a back right corner of the platform 22 and a second end that is connected at a front right corner of the platform 22. Similarly, the second handle 28 includes a first end that is connected at a back left corner of the platform 22 and a second end that is connected at a front left corner of the platform 22. The handles 26, 28 also enable a person to control the movement of the cart 20.

Based on the design of the carts 10, 20, it should be understood that each cart 10, 20 is configured for particular purposes. For example, the cart 10 of FIG. 1A may be configured to move bulky objects that can be placed relatively flat on the platform 12, such as for hauling bags of mulch, large boxes of various types of merchandise, etc. at a home improvement store or other large pieces of equipment in another warehouse setting. Also, the cart 20 of FIG. 1B may be designed for specifically carrying certain items, such as lumber, panels of plywood, and the like.

Although the carts 10, 20 have specific designs for hauling several types of items, there is nevertheless a need for several types of carts in different environments for carrying different types of loads. In particular, there is a need for a type of cart that may have specific benefits for line workers in a manufacturing facility or other similar environments.

BRIEF SUMMARY

The present disclosure is directed to carts, dollies, and the like, for transporting objects along a substantially horizontal surface. According to one implementation, an industrial cart, as described herein, may include a lower frame having sufficient dimensions so as to support a lower crate having a known size. The industrial cart may also include a plurality of wheel assemblies connected to an underside of the lower frame. Furthermore, the industrial cart may include an upper frame having sufficient dimensions so as to support an upper crate having a known size. Also, the industrial cart may include a plurality of vertical posts configured to support the upper frame at any of a plurality of fixed heights above the lower frame.

In some embodiments, the industrial cart may further include a front hitch assembly connected to a front side of the lower frame, whereby the front hitch assembly may be configured to enable removable attachment of the industrial cart to a warehouse utility vehicle or to a forward-positioned cart in a train-type arrangement pulled by a warehouse utility vehicle. The industrial cart may also include a back hitch assembly connected to a back side of the lower frame, whereby the back hitch assembly may be configured to enable removable attachment of a rearward-positioned cart to the industrial cart in a train-type arrangement pulled by the warehouse utility vehicle.

Furthermore, the industrial cart may further include an arm having a first end and a second end, where the first end of the arm may be connected to the front hitch assembly and the second end of the arm may be configured for removable attachment to the warehouse utility vehicle or to the forward-positioned cart in the train-type arrangement. The industrial cart may further include a handle configured to be removably attached to the second end of the arm when the arm is disconnected from the warehouse utility vehicle or forward-positioned cart. The first end of the arm may be rotatably connected to the front hitch assembly to enable the arm to rotate with respect to the front hitch assembly in a pitch orientation to allow a user to manually pull the industrial cart.

The industrial cart, according to some embodiments, may further include a first set of horizontal plates attached near corners of the lower frame, whereby the first set of horizontal plates may be configured to support corners of the lower crate when it is placed on the lower frame. Also, the industrial cart may include a second set of horizontal plates attached near corners of the upper frame, whereby the second set of horizontal plates may be configured to support corners of the upper crate when it is placed on the upper frame. In some embodiments, each horizontal plate of the first and second sets may include two vertically-directed walls or flaps forming a three-dimensional inside corner configured to limit movement in three directions of a respective corner of a respective crate.

Also, each of the lower frame and the upper frame may include a rectangular shape having a forward left corner, a forward right corner, a back right corner, and a back left corner. The plurality of vertical posts described above may include a first post, a second post, a third post, and a fourth post. For example, the first post may connect the forward left corner of the lower frame to the forward left corner of the upper frame; the second post may connect the forward right corner of the lower frame to the forward right corner of the upper frame; the third post may connect the back right corner of the lower frame to the back right corner of the upper frame; and the fourth post may connect the back left corner of the lower frame to the back left corner of the upper frame. For example, the third post and fourth post may be separated by a distance to create sufficient horizontal clearance to allow the lower crate to move therebetween for receiving the lower crate onto the lower frame and/or removing the lower crate from the lower frame.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 1A is an image illustrating a conventional cart.

FIG. 1B is an image illustrating another conventional cart.

FIG. 2 is an image illustrating a front view of a first industrial cart, according to various embodiments of the present disclosure.

FIG. 3 is an image illustrating a back view of the first industrial cart of FIG. 2, according to various embodiments.

FIG. 4 is an image also illustrating a back view of the first industrial cart of FIG. 2, according to various embodiments.

DETAILED DESCRIPTION

Figure 5:
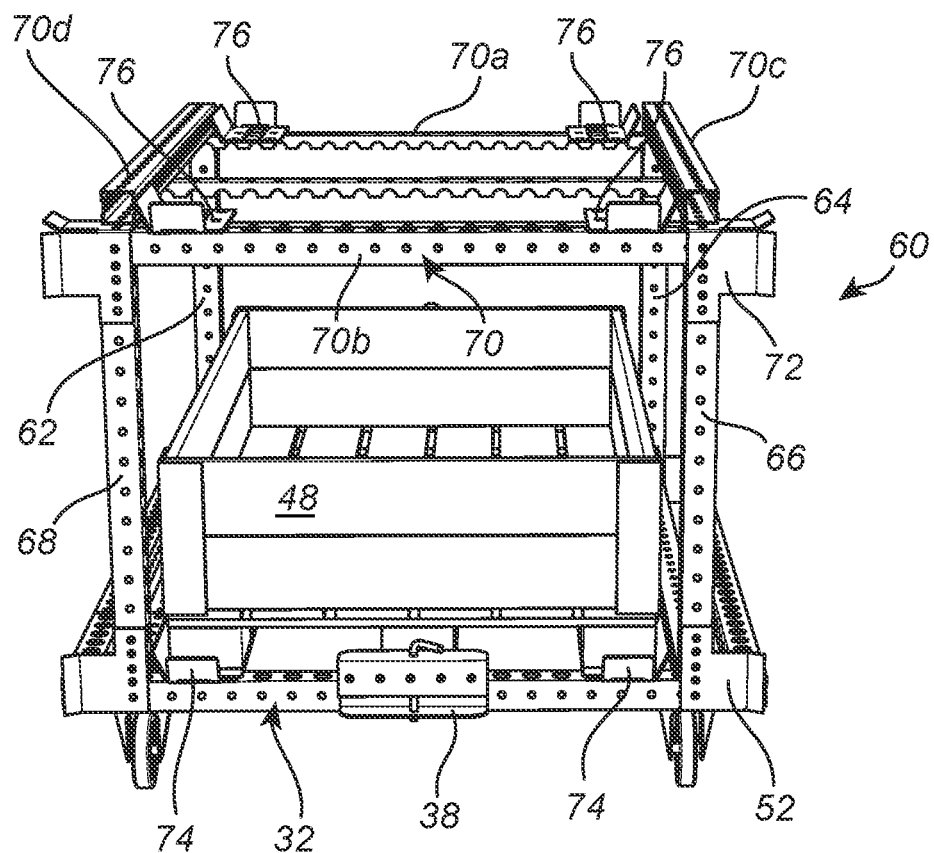
FIG. 5 is an image illustrating a back view of a second industrial cart, according to various embodiments of the present disclosure.

The present disclosure relates to carts (e.g., industrial carts) for carrying large loads. In particular, the carts described in the present disclosure are double-decker carts having two (or more) levels where items (to be hauled) can be supported. More particularly, each level of the heavy-duty carts described in the present disclosure is configured to support a loaded pallet or crate, where the pallet or crate is of a common or known size. For example, common pallet sizes may include 40×48 (i.e., 40 inches wide by 48 inches long), 42×42, 48×48, etc., and some crates may also be configured with similar sizes with the pallet-type base arrangement for use with an electric forklift or manually-operated pallet jack. It should be understood that the dimensions of the pallets or carts described in the present disclosure are not limited by any specific dimensions or common sizes, but may include any suitable dimensions for supporting any type of container, crate, bin, pallet, platform, base, etc. that, in turn, may be configured to hold or support other (typically smaller) types of items.

For example, along an assembly line in a manufacturing plant (e.g., for manufacturing vehicles), a line worker may need to keep a large number of items near him or her for adding these items to the manufactured objects (e.g., vehicles) as they are passed down the line. In some cases, not only should a cart (e.g., large enough to carry multiple items) be able to be transported to the line worker's station, but also the line worker should be able to manually move the cart within a certain range to allow the line worker to complete his or her tasks for efficiently.

FIGS. 2-4 show images of an industrial cart 30 according to a first embodiment. FIG. 2 is an image showing a front view of the industrial cart. Also, FIGS. 3 and 4 are images showing a back view of the industrial cart 30. As shown, the industrial cart 30 includes a lower frame 32 and an upper frame 34, where each frame 32, 34 is configured to support a loaded pallet or crate. It should be noted that the embodiments of the present disclosure do not necessarily include the crates, pallets, bins, etc. and/or the items stored therein or thereon, but instead may be configured to support any types of crates, pallets, bins having any known size, while the industrial cart 30 is in use.

Each frame of the lower frame 32 and upper frame 34 may include a rectangular shape, including, for example, at least a front metal beam, a back metal beam, a right side metal beam, and a left side metal beam. In some embodiments additional metal beams may be used in the frames 32, 34 for additional strength. Also, according to some embodiments, each beam (not labelled in the drawings) may include one or two corresponding metal pieces. The beams (and/or half-beams) can be connected together by hardware elements (e.g., connectors, nuts, bults, etc.), by a welding process, or by other suitable means.

Furthermore, the industrial cart 30 includes a front hitch assembly 36 and a back hitch assembly 38. The front hitch assembly 36 may be configured with suitable elements to enable the industrial cart 30 to be linked with another cart. In this respect, when multiple carts are linked together in a train, a warehouse utility vehicle may be used to pull this train from one area of a warehouse or manufacturing facility to another. Therefore, the front hitch assembly 36 may be used for connection to another cart which is in front of the industrial cart 30 in the train. The back hitch assembly 38 may be used for connection to another cart which is behind the industrial cart 30 in the train. Furthermore, the front hitch assembly 36 may include arms, links, handles, etc. used for connections to the forward-located cart or for manually pulling the industrial cart 30 by a human.

Also, the industrial cart 30 includes multiple (e.g., four) vertical posts used for supporting the upper frame 34 above the lower frame 32. In some embodiments, these vertical posts may include a front left post 40, a front right post 42, a back right post 44, and a back left post 46. These posts 40, 42, 44, 46 may also include steel or metal material and may be configured similar to the beams used for constructing the lower frame 32 and upper frame 34. With this general construction, the industrial cart 30 may be configured to support a first crate 48 (e.g., on the lower frame 32) and support a second crate 50 (e.g., on the upper frame 34). Again, these crates 48, 50 may include a common or known size. In this example, the crates 48, 50 may be configured as 40"×48" pallets and may be configured with walls for supporting any type of items (e.g., vehicle parts installed during manufacturing).

The industrial cart 30 also includes any suitable type of connection elements and/or hardware for connecting the posts 40, 42, 44, 46 to the lower frame 32 and for connecting the upper frame 34 to the posts 40, 42, 44, 46. In particular, the industrial cart 30 may include a first set 52 of connectors and hardware for connecting the posts 40, 42, 44, 46 to the lower frame 32. Also, the industrial cart 30 may include a second set 54 of connectors and hardware for connecting the upper frame 34 to the posts 40, 42, 44, 46. For example, the first and second sets 52, 54 of connectors and hardware may include plate brackets, corner brackets, angled brackets, etc., as well as mating fasteners, such as nuts, bolts, barrel bolts, etc.

It should be noted that the connectors and hardware may be removable to allow the upper frame 34 to be connected to the posts 40, 42, 44, 46 at any suitable height above the lower frame 32. Therefore, based on a known height of the lower crate 48 (and its contents), the upper frame 34 can be positioned to allow a forklift operator to lift the crate (or pallet) through a "window" formed by the frames 32, 34 and posts 40, 42, 44, 46 and place the crate or pallet onto the lower frame 32. Therefore, the width between posts (e.g., between the back right post 44 and back left post 46 when the lower crate 48 is loaded from the back of the industrial cart 10) is configured to be sufficient to allow enough clearance such that the forklift operator can fit the lower crate 48 between the posts. For example, assuming that the width of the crate 48 is 40", the width between the posts 44, 46 may be at least 42". Also, the height of the upper frame 34 above the lower frame 32 may be adjusted, as needed, to allow enough headspace based on the height of the crate 48 and its contents to fit through the "window." Furthermore, the four windows that are at the front side, right side, back side, and left side of the industrial cart 30 should also allow sufficient space such that the line worker is able to easily pull items out of the lower crate 48 when needed.

The industrial cart 30 may also be configured, in particular, to sufficiently support a certain sized rectangular objects (e.g., pallets, crates, containers, bins, etc.) on each of the lower frame 32 and upper frame 34. Therefore, the industrial cart 30 may include a plurality of corner supports that specifically support each corner of the rectangular pallet-type objects. For example, four corner supports may be used for supporting each corner of the rectangular pallet-type objects. More particularly, the industrial cart 30 may include a first set 56 of corner supports connected to the lower frame 32 and a second set 58 of corner supports connected to the upper frame 34. Each corner support of the first and second sets 56, 58 may be arranged to receive the weight of the respective corner of the respective crate 48, 50. That is, a front right corner support of the first set 56 may be configured to support the weight of the front right corner of the crate 48 when the crate 48 is placed on the lower frame 32, a front left corner support of the first set 56 may be configured to support the weight of the front left corner of the crate 48 when the crate 48 is placed on the lower frame 32, and so on.

Therefore, according to one embodiment of the present disclosure, the industrial cart 30 may be configured to move along a substantially horizontal surface (e.g., any floor of a building, the floor of a warehouse, etc.). The industrial cart 30 may include the lower frame 32, having sufficient dimensions so as to support the lower crate 48, which may have a common size (e.g., 40"×48"). The industrial cart 30 may also include a plurality of wheels connected to an underside of the lower frame 32 to allow the industrial cart 30 to move. Also, the industrial cart 30 may include the upper frame 34, having sufficient dimensions so as to support the upper crate 50, which may also have a common size (e.g., 40"×48"). In this embodiment, the industrial cart 30 may also include a plurality of vertical posts 40, 42, 44, 46 configured to support the upper frame 34 at any of a plurality of fixed heights above the lower frame.

According to additional embodiments, the industrial cart 30 may further include the front hitch assembly 36 connected to a front side of the lower frame 32. The front hitch assembly 36 may be configured to enable removable attachment of the industrial cart 30 to a warehouse utility vehicle or to a forward-positioned cart in a train-type arrangement pulled by a warehouse utility vehicle. The industrial cart 30 may also include the back hitch assembly 38 connected to a back side of the lower frame 32. The back hitch assembly 38 may be configured to enable removable attachment of a rearward-positioned cart to the industrial cart in the train-type arrangement. The industrial cart 30 may include an arm having a first end and a second end, whereby the first end of the arm may be connected to the front hitch assembly 36 and the second end of the arm configured for removable attachment to the warehouse utility vehicle or forward-positioned cart in the train-type arrangement. In some embodiments, a handle may be removably attached to the second end of the arm when the arm is disconnected from the warehouse utility vehicle or forward-positioned cart. The first end of the arm may be rotatably connected to the front hitch assembly 36 to adjust to any suitable angle for allow a user to pull the industrial cart 30. In this way, the arm can rotate with respect to the front hitch assembly 36 in a pitch orientation to allow the user to manually pull the industrial cart 30.

In some embodiments, the industrial cart 30 may further include the first set 56 of horizontally-arranged plates or corner supports attached near corners of the lower frame 32. This first set 56 of plates or corner supports is configured to support the corners of the lower crate 48 when it is placed on the lower frame 32. Also, the industrial cart 30 may include a second set 58 of horizontally-arranged plates or corner supports attached near corners of the upper frame 34. The second set 58 of horizontal plates/supports is configured to support the corners of the upper crate 50 when it is placed on the upper frame 34.

Figure 7:
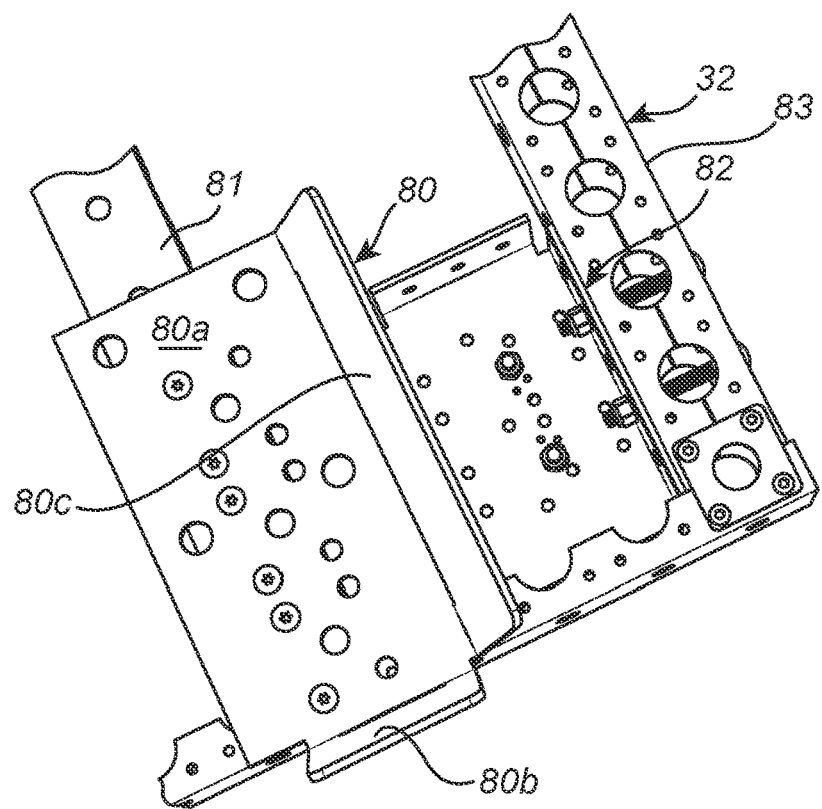
FIG. 7 is an image illustrating a corner support connected to the lower frame of the first or second industrial carts of FIGS. 2 and 5, according to various embodiments.
Figure 8:
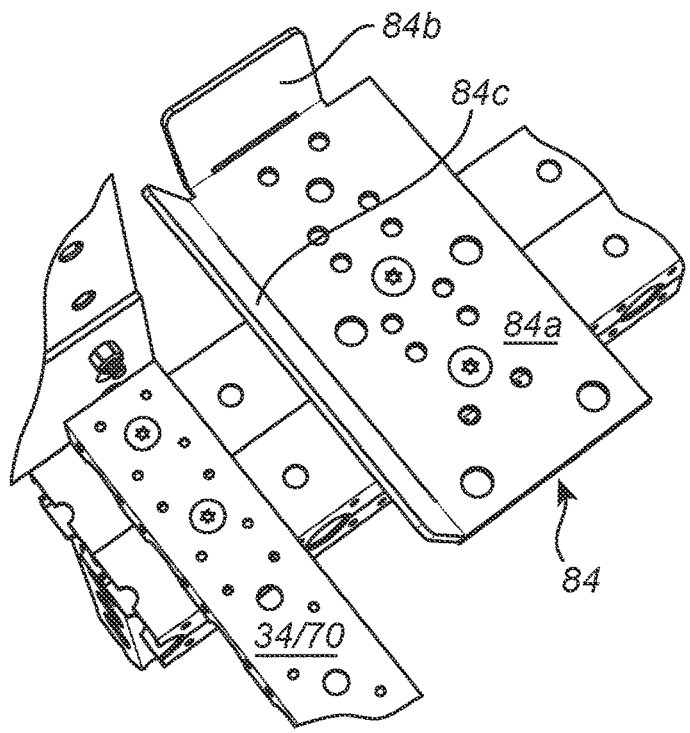
FIG. 8 is an image illustrating a corner support connected to the upper frame of the first industrial cart of FIG. 2, according to various embodiments.

Each of the horizontal plates or corner supports of the first and second sets 56, 58 may include two vertically-directed walls or flaps as described in more detail with respect to FIGS. 7 and 8. For instance, the plates/supports for supporting the respective crate corners may include the horizontal portion that supports the weight (at that corner) as well as two perpendicularly bent edges that form a three-dimensional inside corner structure that is configured to limit the movement of the respective crate 48, 50 in three different (perpendicular) directions. For example, one edge may be bent upward from the horizontal base of the plate/support to form a wall that limits the movement of the crate 48, 50 in a sideways direction. Likewise, another edge of the plate/support may be bent upward from the horizontal base to form a wall that limits the movement of the crate in a forward or backward direction.

Each frame of the lower frame 32 and the upper frame 34 may include a rectangular shape having a forward left corner, a forward right corner, a back right corner, and a back left corner. The plurality of vertical posts 40, 42, 44, 46 may include a first post, a second post, a third post, and a fourth post, whereby the first post 40 connects the forward left corner of the lower frame 32 to the forward left corner of the upper frame 34, the second post 42 connects the forward right corner of the lower frame 32 to the forward right corner of the upper frame 34, the third post 44 connects the back right corner of the lower frame 32 to the back right corner of the upper frame 34, and the fourth post 46 connects the back left corner of the lower frame 32 to the back left corner of the upper frame 34. The third post 44 and fourth post 46 (e.g., back posts) may be separated by a distance to create sufficient horizontal clearance to allow the lower crate 48 to move therebetween for receiving the lower crate 48 onto the lower frame 32 and/or for removing the lower crate 48 from the lower frame 32.

The wheels of the industrial cart 30 may include a first wheel, a second wheel, a third wheel, and a fourth wheel. For example, the first wheel may be attached near the forward left corner of the lower frame 32, the second wheel may be attached near the forward right corner of the lower frame 32, the third wheel may be attached near the back right corner of the lower frame 32, and the fourth wheel may be attached near the back left corner of the lower frame 32. At least the first wheel and the second wheel, for example, may be caster-type wheels, which may allow the wheel to swivel and to allow easier steerability of the industrial cart 30.

The lower frame 32, upper frame 34, and vertical posts 40, 42, 44, 46 may include any suitable material having sufficient strength (e.g., metal, steel, alloys, etc.). The first set 52 of connection brackets and mating fasteners may be used for connecting the vertical posts 40, 42, 44, 46 to the lower frame 32. The second set 54 of connection brackets and mating fasteners may be used for connecting the upper frame 34 to the vertical posts 40, 42, 44, 46. The second set 54 of connection brackets and mating fasteners may be removable and reconnectable to enable the upper frame 34 to be supported by the vertical posts 40, 42, 44, 46 at any of a plurality of fixed heights above the lower frame 32.

Figure 6:
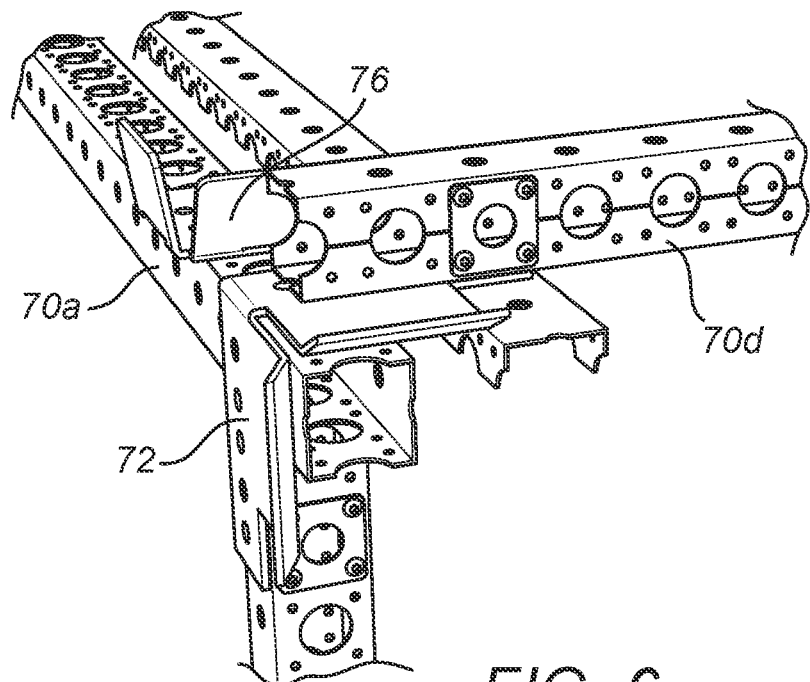
FIG. 6 is an image illustrating the connection of an upper frame to a horizontal post of the second industrial cart of FIG. 5, according to various embodiments.

FIGS. 5 and 6 show images of an industrial cart 60 according to a second embodiment. FIG. 5 is an image showing a back view of the industrial cart 60. FIG. 6 shows connection features of an upper frame with respect to a vertical post of the industrial cart 60. In this embodiment, the industrial cart 60 includes many similarities to the embodiment of the industrial cart 30 shown in FIGS. 2-4.

In this embodiment, the industrial cart 60 includes the lower frame 32, front hitch assembly 36 (not shown in FIG. 5), back hitch assembly 38, and first set 52 of connectors and hardware, which are similar to the industrial cart 30. In addition, the industrial cart 60 includes a front left post 62, a front right post 64, a back right post 66, and a back left post 68. According to this embodiment, the posts 62, 64, 66, 68 may have a predetermined height to create a large enough window, formed by the upper and lower frames and the particular pair of posts, such that the lower crate 48 (with its contents) can be placed on the lower frame 32 and such that the line operator will be able to easily remove the items from the lower crate 48 when needed.

The industrial cart 60 further includes an upper frame 70 which may be slightly different from the upper frame 34 shown in FIGS. 2-4. For example, the upper frame 70 may include a front beam 70a that sits on top of the posts 62, 64 and a back beam 70b that sits on top of the posts 66, 68. A set 72 of connectors and hardware (e.g., brackets, mating hardware components, etc.) is used to connect the upper frame 70 to the posts 62, 64, 66, 68. The upper frame 70 may also include side beams 70c, 70d that sit on top of the front and back beams 70a, 70b and are attached thereto using the set 72 of connectors and hardware.

Furthermore, the lower frame 32 includes a first set 74 of corner supports (e.g., one corner support at each of the four corners), which may be used for supporting the lower crate 48. A second set 76 of corner supports is connected to the upper frame 70 and may be used to support an upper crate (not shown in FIG. 5). Each of the corner supports of the first and second sets 74, 76 may have substantially the same shape and/or features as the types of corner supports used with respect to the embodiment of the industrial cart 30 of FIGS. 2-4.

FIG. 7 is an image showing a top view of an embodiment of a corner support and may represent any of the corner supports 56, 74 connected to the lower frame 32 of the first or second industrial carts 30, 60 described above. The corner support 80 in this embodiments may include a horizontal portion 80a, which may be attached, using suitable hardware, to a horizontal support (e.g., beam) of the lower frame 32. In this embodiment, the corner support 80 sits on top of an intermediate beam 81 of the lower frame 32. Also, a wheel assembly 82 may be sandwiched by and connected to an outer beam 83 of the lower frame 32 and the intermediate beam 81. The wheel assembly 82 may also be attached to a front or back beam of the lower frame 32. The wheel assembly 82 may include an attachment base element, a wheel or caster (hidden from view), and hardware for attaching the wheel or caster to the attachment base element. The attachment base element may be used for attaching the wheel assembly 82 to the different beams of the lower frame 32.

Furthermore, the bottom corner support 80 may also include an end wall 80b, which may be a flange or a bended edge of a sheet of metal used for forming the corner support 80, whereby the end edge if folded or bent upward (e.g., at about 90°) with respect to the horizontal portion 80a. The corner support 80 also includes a side wall 80c, which also may be a flange or a side edge that has been bent or folded upward. The end wall 80b may be used to limit the movement of a crate or pallet (placed on the lower frame 32) in the forward direction (for a front side positioned corner support 80) or in the backward direction (for a back side positioned corner support 80). The side wall 80c may be configured to limit the movement of the crate or pallet (placed on the lower frame 32) in a rightward direction (for a right side positioned corner support 80) or in a leftward direction (for a left side positioned corner support 80).

FIG. 8 is an image showing a top view of an embodiment of a corner support 84 and may represent any of the corner supports 58, 76 connected to the upper frame 34, 70 of the first or second industrial carts 30, 60. The corner support 84 may be the same as or similar to the corner support 80 described with respect to FIG. 7. The corner support 84, as shown in the embodiment of FIG. 8, includes a horizontal portion 84a, an end wall 84b, and a side wall 84c. Again, the three planes formed by the horizontal portion 84a, end wall 84b, and side wall 84c of the corner support 84 may be used to limit the movement of a crate or pallet (placed on the upper frame 34, 70 in three different directions.

Figure 9:
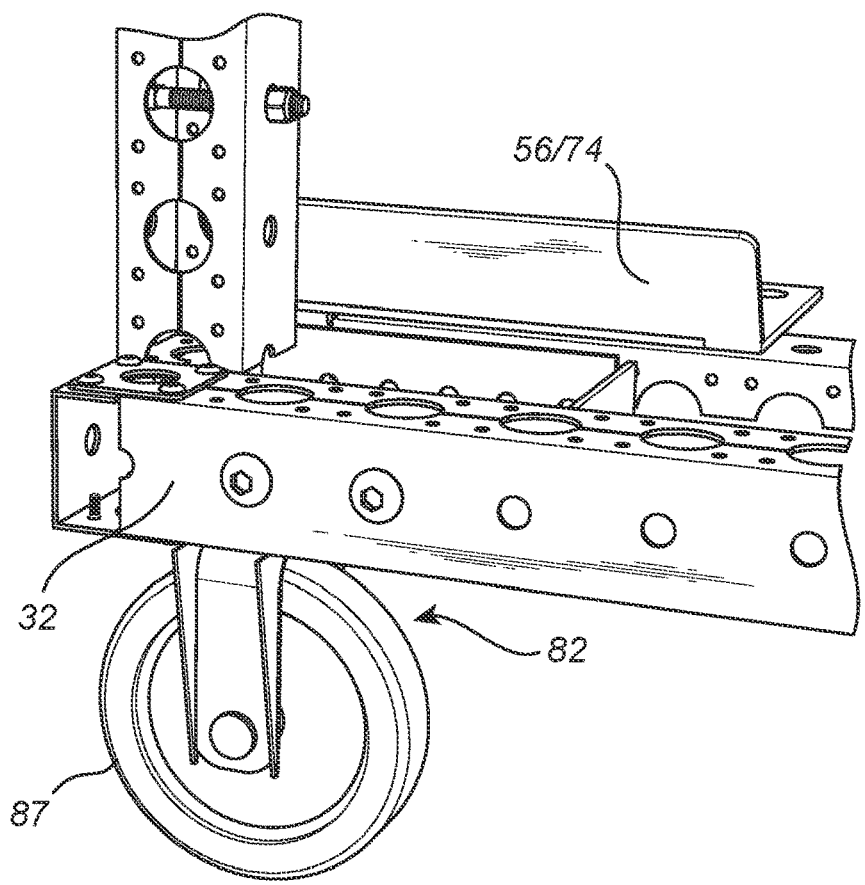
FIG. 9 is an image illustrating a wheel assembly attached to the lower frame of the first or second industrial carts of FIGS. 2 and 5, according to various embodiments.

FIG. 9 is an image of an embodiment of the wheel assembly 82 shown in FIG. 7. The wheel assembly 82 is configured to be attached to the lower frame 32 of the first or second industrial carts 30, 60. The wheel assembly 82 may include a wheel or caster 87, an attachment base element (shown in FIG. 7), and hardware (e.g., nuts, bolts, etc.) for attaching the wheel or caster 87 to the attachment base element and for attaching the attachment base element to the beams of the lower frame 32. In some embodiments, the front wheels 87 may be configured to swivel about a vertical axle to enable the industrial cart 30, 60 to steer more easily. In some embodiments, the back wheels 87 may also be capable of swiveling, or alternatively may be fixed with a front-to-back alignment.

Figure 10:
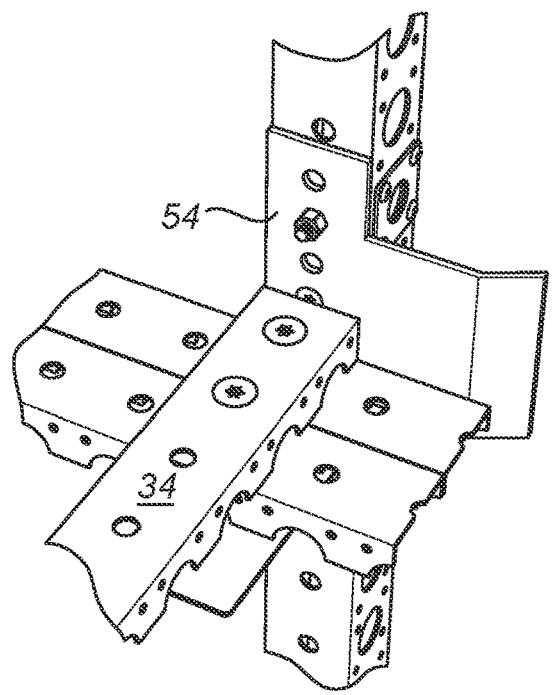
FIG. 10 is an image illustrating an upper set of connection elements and hardware for connecting the upper frame to a vertical post of the first industrial cart of FIG. 2, according to various embodiments.

FIG. 10 is an image showing the details of an embodiment of the upper set 54 of connection elements and hardware for connecting the upper frame 34 to a vertical post (e.g., one of the posts 40, 42, 44, 46) of the first industrial cart 30 shown in FIGS. 2-4.

Figure 11:
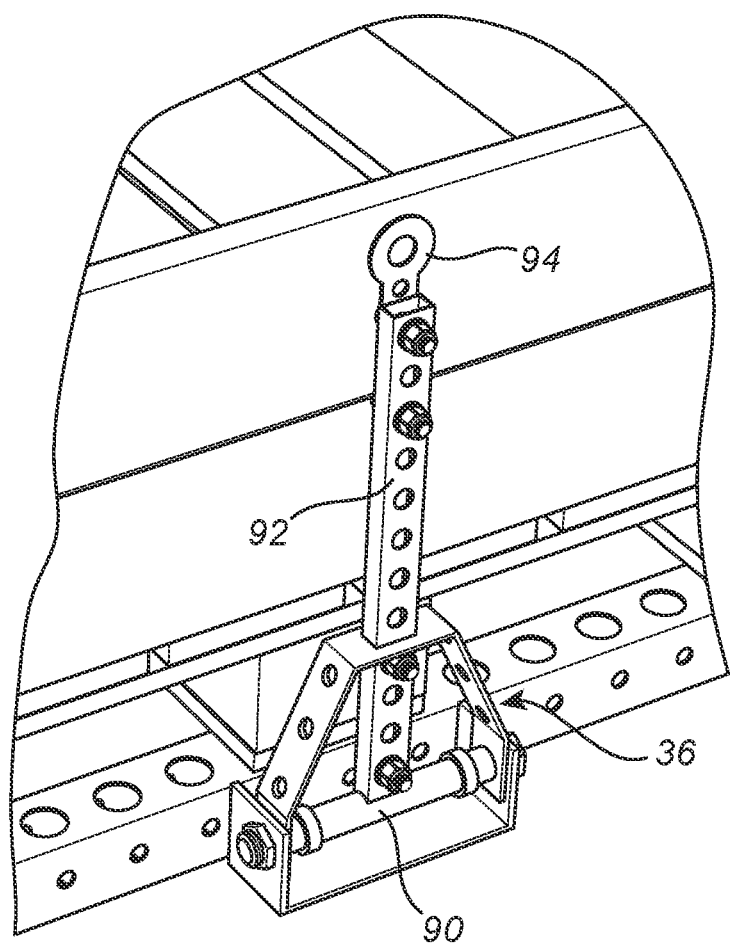
FIG. 11 is an image illustrating an arm connected to the front hitch assembly of the first or second industrial carts of FIGS. 2 and 5, according to various embodiments.

FIG. 11 is an image showing an embodiment of an arm 92 that may be connected to the front hitch assembly 36 of the first or second industrial carts 30, 60. In this embodiment, the arm 92 may be configured as a metal or steel rod or beam connected to an axle 90 on the front hitch assembly 36. The axle 90 allow the arm 92 to rotate about the axis of the axle 90. In the upper position, as shown in FIG. 11, the arm 92 may be secured in order to keep it out of the way while the line worker is busy with other tasks.

Figure 12:
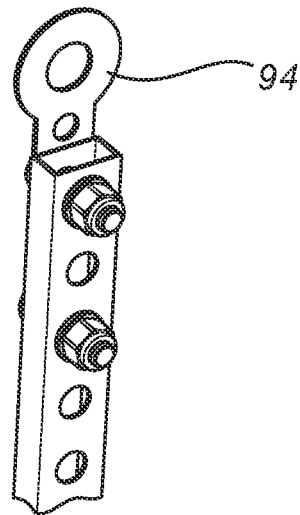
FIG. 12 is an image of a coupling attached to the arm shown in FIG. 11, according to various embodiments.

FIG. 12 is an image of a coupling 94 attached to the arm 32 shown in FIG. 11. When the arm 92 is in a horizontal position, the coupling 94 may be used for connection with another cart that is located in front of the industrial cart 30, 60 in a train configuration. As such, a warehouse utility vehicle may be used for pulling the train of linked carts. In an intermediate position between the vertical and horizontal positions, the arm 92 (unlinked from the train) can be used in a manual mode, where a user can manually pull the industrial cart 30, 60, as needed. It may be noted, however, that because of the size and weight of the industrial cart 30, 60, particularly when loaded with two crates/pallets filled with assorted items, it may be somewhat difficult to pull the industrial cart 30, 60 manually. Nevertheless, the person may be able to move the cart 30, 60 within a certain work area. Also, in some embodiments, a handle (not shown) may be attached to the coupling 94 or arm 92 to enable the user to pull the cart 30, 60 more easily.

Therefore, the embodiments described in the present disclosure provide certain advantages over conventional carts. For instance, the industrial carts 30, 60 are configured as heavy-duty carts for hauling bulky and/or cumbersome loads. Although supporting and pulling a single pallet or crate on a cart may be fine in many cases, occasionally there is a need for pulling a greater load. Thus, the embodiments of the present disclosure are configured to carry two pallets/crates at once, which can minimize the amount of horizontal space occupied by the carts and allows a user to have access to a greater amount of materials or items that may be needed in a specific area, such as a vehicle manufacturing work area of an assembly line where a worker may need to assembly multiple vehicle parts, multiple types of parts for different types of vehicles, etc.

The carts 30, 60 may be configured as two-level container dollies for hauling parts that can be used in line side production and logistics. The stacked design of the cart 30, 60 may be create such that there will be enough space between the two levels of the two-level container dollies for the line production operator to pick parts from both levels. The configurations of the carts 30, 60 may result in a lean manufacturing process and improvements with respect to innovation management, accounting for executives, and structural engineering for getting parts to the production line without taking up space horizontally. In some respects, two cart 30, 60 may be brought to the production line, where one may be used on the left side of the assembly line and one may be used on the right side of the assembly line. Also, it may be noted that each cart 30, 60 may include the same (or mirrored) parts for the left-hand and right-hand sides. The embodiments are configured to keep the cost of getting parts to the line at a minimum. Also, the carts 30, 60 may be configured to reduce or eliminate the excessive cost of kitting (i.e., bundling items into a "kit" to be assembled later).

The embodiments of the carts 30, 60 are configured to meet certain ergonomic specifications and safety specification. The carts 30, 60 are configured for the support of a unit load, mobility, constructability, and functionality. Along with many other factors that can drive manufacturing cost upward, the embodiment of the carts 30, 60 may help to reduce the costs associated with transporting items to the assembly lines, such as by allowing a greater amount of items to be delivered by an electric tractor, warehouse utility vehicle, etc., at a time. It may be noted that left and right hand sides can be paired more easily with bigger loads and may have the same take rate and replenishment rate.

According to one embodiment, the carts 30, 60 may be built on top of a tugger container cart that is 1260 mm×1260 mm. Also, the carts 30, 60 may include certain materials, such as about 43 nuts, about four hexagon head bolts (3.5 inch), about 28 flat head bolts (3.5 inch), about 16 half-size bolts (1 inch), about four metal bars (blue) (43⅝ length) for the top shelf, about 12 metal bars (blue) (46⅞") also for the top shelf, about 16 bolt barrels (3.5 inch), about eight L-plates (white) (⅛"), about four additional L-plates (silver) (1/16"), and about eight crate plates (black) 56, 58, 76, 80, 84. Of course, these specific details are not meant to limit any embodiments of the present disclosure, since changes to the types of elements and number of elements can be made without departing from the spirit and scope of the disclosed embodiments.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An industrial cart configured to move along a substantially horizontal surface, the industrial cart comprising:
   a lower frame having sufficient dimensions so as to support a lower crate having a known size, wherein the lower frame comprises a front beam, a back beam, a right side beam, a left side beam, an intermediate beam disposed adjacent to the right side beam, and an intermediate beam disposed adjacent to the left side beam;
   a plurality of wheel assemblies connected to an underside of the lower frame between the right side beam and the intermediate beam disposed adjacent to the right side beam and a plurality of wheel assemblies connected to the underside of the lower frame between the left side beam and the intermediate beam disposed adjacent to the left side beam;

an upper frame having sufficient dimensions so as to support an upper crate having a known size;

a plurality of vertical posts configured to support the upper frame at any of a plurality of fixed heights above the lower frame;

a first set of horizontal plates attached to the intermediate beam disposed adjacent to the right side beam near corners of the lower frame and a first set of horizontal plates attached to the intermediate beam disposed adjacent to the left side beam near corners of the lower frame, the first sets of horizontal plates configured to support corners of the lower crate when placed on the lower frame; and a second set of horizontal plates attached near corners of the upper frame, the second set of horizontal plates configured to support corners of the upper crate when placed on the upper frame.

2. The industrial cart of claim 1, further comprising a front hitch assembly connected to a front side of the lower frame, the front hitch assembly configured to enable removable attachment of the industrial cart to a warehouse utility vehicle or to a forward-positioned cart in a train-type arrangement pulled by a warehouse utility vehicle.

3. The industrial cart of claim 2, further comprising a back hitch assembly connected to a back side of the lower frame, the back hitch assembly configured to enable removable attachment of a rearward-positioned cart to the industrial cart in a train-type arrangement pulled by a warehouse utility vehicle.

4. The industrial cart of claim 2, further comprising an arm having a first end and a second end, the first end of the arm connected to the front hitch assembly, the second end of the arm configured for removable attachment to the warehouse utility vehicle or to the forward-positioned cart in the train-type arrangement.

5. The industrial cart of claim 4, further comprising a handle configured to be removably attached to the second end of the arm when the arm is disconnected from the warehouse utility vehicle or forward-positioned cart, wherein the first end of the arm is rotatably connected to the front hitch assembly to enable the arm to rotate with respect to the front hitch assembly in a pitch orientation to allow a user to manually pull the industrial cart.

6. The industrial cart of claim 1, wherein each horizontal plate of the first and second sets of horizontal plates includes two walls directed substantially vertically to thereby form a three-dimensional inside corner configured to limit movement in three directions of a respective corner of a respective crate.

7. The industrial cart of claim 1, wherein each of the lower frame and the upper frame includes a rectangular shape having a forward left corner, a forward right corner, a back right corner, and a back left corner.

8. The industrial cart of claim 7, wherein the plurality of vertical posts includes a first post, a second post, a third post, and a fourth post, and wherein the first post connects the forward left corner of the lower frame to the forward left corner of the upper frame, the second post connects the forward right corner of the lower frame to the forward right corner of the upper frame, the third post connects the back right corner of the lower frame to the back right corner of the upper frame, and the fourth post connects the back left corner of the lower frame to the back left corner of the upper frame.

9. The industrial cart of claim 8, wherein the third post and fourth post are separated by a distance to create sufficient horizontal clearance to allow the lower crate to move therebetween for receiving the lower crate onto the lower frame and/or removing the lower crate from the lower frame.

10. The industrial cart of claim 7, wherein the plurality of wheel assemblies includes a first wheel assembly, a second wheel assembly, a third wheel assembly, and a fourth wheel assembly, and wherein the first wheel assembly is attached near the forward left corner of the lower frame, the second wheel assembly is attached near the forward right corner of the lower frame, the third wheel assembly is attached near the back right corner of the lower frame, and the fourth wheel assembly is attached near the back left corner of the lower frame.

11. The industrial cart of claim 10, wherein at least the first wheel assembly and the second wheel assembly include caster-type wheels configured to swivel.

12. The industrial cart of claim 1, wherein the lower frame, upper frame, and vertical posts include metal or steel.

13. The industrial cart of claim 12, further comprising a first set of connection brackets and mating fasteners for connecting the vertical posts to the lower frame and a second set of connection brackets and mating fasteners for connecting the upper frame to the vertical posts.

14. The industrial cart of claim 13, wherein the second set of connection brackets and mating fasteners are removable and reconnectable to enable the upper frame to be supported by the vertical posts at any of the plurality of fixed heights above the lower frame.

15. The industrial cart of claim 1, wherein the lower and upper crates, configured to be supported by the lower and upper frames, respectively, each have a known size of about 40 inches in width and about 48 inches in length.

16. A dolly, comprising:
a plurality of wheels;
a lower frame having sufficient dimensions so as to support a lower crate having a known size;
an upper frame having sufficient dimensions so as to support an upper crate having a known size; and
a plurality of vertical posts configured to support the upper frame at any of a plurality of fixed heights above the lower frame;
wherein the lower frame comprises a front beam, a back beam, a right side beam, a left side beam, an intermediate beam disposed adjacent to the right side beam, and an intermediate beam disposed adjacent to the left side beam;
wherein a pair of the plurality of wheels are connected to an underside of the lower frame between the right side beam and the intermediate beam disposed adjacent to the right side beam and a pair of the plurality of wheels are connected to the underside of the lower frame between the left side beam and the intermediate beam disposed adjacent to the left side beam;
wherein a first set of horizontal plates are attached to the intermediate beam disposed adjacent to the right side beam near corners of the lower frame and a first set of horizontal plates are attached to the intermediate beam disposed adjacent to the left side beam near corners of the lower frame, the first sets of horizontal plates configured to support corners of the lower crate when placed on the lower frame; and wherein a second set of horizontal plates are attached near corners of the upper frame, the second set of horizontal plates configured to support corners of the upper crate when placed on the upper frame.

17. The dolly of claim 16, further comprising a front hitch assembly connected to a front side of the lower frame, the front hitch assembly configured to enable removable attachment to a warehouse utility vehicle or to a forward-positioned cart in a train-type arrangement pulled by a warehouse utility vehicle.

18. The dolly of claim 17, further comprising a back hitch assembly connected to a back side of the lower frame, the back hitch assembly configured to enable removable attachment with a rearward-positioned cart in a train-type arrangement pulled by a warehouse utility vehicle.

19. The dolly of claim 17, further comprising:
- an arm having a first end and a second end, the first end of the arm rotatably connected to the front hitch assembly, the second end of the arm configured for removable attachment to the warehouse utility vehicle or forward-positioned cart; and
- a handle configured to be removably attached to the second end of the arm when the arm is disconnected from the warehouse utility vehicle or forward-positioned cart, the first end of the arm being rotatable with respect to the front hitch assembly in a pitch orientation to allow a user to manually pull the dolly.

* * * * *